(12) United States Patent
Liu

(10) Patent No.: US 11,935,015 B2
(45) Date of Patent: *Mar. 19, 2024

(54) DATA PROCESSING METHOD AND APPARATUS, COMPUTER DEVICE, AND STORAGE MEDIUM

(71) Applicant: Tencent Technology (Shenzhen) Company Limited, Shenzhen (CN)

(72) Inventor: Changhui Liu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/093,313

(22) Filed: Jan. 4, 2023

(65) Prior Publication Data

US 2023/0144811 A1    May 11, 2023

Related U.S. Application Data

(63) Continuation of application No. 17/146,937, filed on Jan. 12, 2021, now Pat. No. 11,574,290, which is a
(Continued)

(30) Foreign Application Priority Data

Jan. 23, 2019    (CN) .......................... 201910063326.1

(51) Int. Cl.
*G06Q 20/06*    (2012.01)
*G06Q 20/38*    (2012.01)
*G06Q 40/12*    (2023.01)

(52) U.S. Cl.
CPC ..... *G06Q 20/0655* (2013.01); *G06Q 20/3827* (2013.01); *G06Q 20/389* (2013.01); *G06Q 40/12* (2013.12)

(58) Field of Classification Search
None
See application file for complete search history.

(56) References Cited

U.S. PATENT DOCUMENTS 5,903,881 A * 5/1999 Schrader ............... G07F 19/201
                                                            705/42
10,261,711 B1 * 4/2019 Pasirstein ............. H04L 9/0637
(Continued)

FOREIGN PATENT DOCUMENTS

CN    106686087 A    5/2017
CN    107423426 A    12/2017
(Continued)

OTHER PUBLICATIONS

Ogiela, Marek R., and Michal Majcher. "Security of distributed ledger solutions based on blockchain technologies." 2018 IEEE 32nd International Conference on Advanced Information Networking and Applications (AINA). IEEE, 2018. (Year: 2018).*
(Continued)

*Primary Examiner* — David P Sharvin
*Assistant Examiner* — Brock E Turk
(74) *Attorney, Agent, or Firm* — Morgan, Lewis & Bockius LLP

(57) ABSTRACT

This application relates to a data processing method performed by a computer device. The method includes: for each block of a plurality of blocks in a first block file of a blockchain platform, detecting a to-be-maintained transaction record in the block; selecting, from a hash tree of the block, nodes used for proving that the transaction record belongs to the block; constructing a node maintenance tree according to the selected nodes; storing the transaction record at a corresponding leaf node of the node maintenance tree; migrating an association between a block head of the block and the node maintenance tree storing the transaction record from the first block file to a second block file, the
(Continued)

block head of the block being adjacent to a block head of a previous block in the second block file; and deleting the first block file after the update processing for each block is completed.

20 Claims, 7 Drawing Sheets

Related U.S. Application Data continuation of application No. PCT/CN2020/073127, filed on Jan. 20, 2020.

(56) References Cited

U.S. PATENT DOCUMENTS

| | | | |
|---|---|---|---|
| 2018/0101701 A1 | 4/2018 | Barinov et al. | |
| 2018/0137512 A1 | 5/2018 | Georgiadis et al. | |
| 2018/0139278 A1 | 5/2018 | Bathen et al. | |
| 2018/0189312 A1* | 7/2018 | Alas | H04L 9/3239 |
| 2018/0349621 A1 | 12/2018 | Schvey et al. | |
| 2019/0197562 A1* | 6/2019 | Woerner | G06F 16/2246 |
| 2019/0268138 A1 | 8/2019 | Mankovskii et al. | |
| 2020/0125269 A1 | 4/2020 | Karame et al. | |
| 2021/0182849 A1 | 6/2021 | Davies et al. | |

FOREIGN PATENT DOCUMENTS

| | | |
|---|---|---|
| CN | 107728941 A | 2/2018 |
| CN | 107807608 A | 3/2018 |
| CN | 108270836 A | 7/2018 |
| CN | 108615156 A | 10/2018 |
| CN | 108696356 A | 10/2018 |
| CN | 110264187 A | 9/2019 |
| KR | 20160106570 A | 9/2016 |
| KR | 101924026 B1 | 11/2018 |
| WO | WO 2018103850 A1 | 6/2018 |

OTHER PUBLICATIONS

Rush, Thomas "Decentralized, Off-Chain, per-Block Accounting, Monitoring, and Reconciliation for Blockchains" https://trueblocks.io/papers/2017/decentralized-off-chain-per-block-accounting-monitoring-and-reconciliation-for-blockchains.pdf Jul. 24, 2017 (Year: 2017).*

Extended European Search Report, EP20745941.3, dated Jan. 19, 2022, 9 pgs.

Thomas Jay Rush, "Decentralized, Off-Chain, per-Block Accounting, Monitoring, and Reconciliation for Blockchains", Jul. 24, 2017, 14 pgs., Retrieved from the Internet: https://trueblocks.io/papers/2017/decentralized-off-chain-per-block-accounting-monitoring-and-reconciliation-for-blockchains.pdf.

Tencent Technology, ISRWO, PCT/CN2020/073127, Apr. 22, 2020, 6 pgs.

Tencent Technology, IPRP, PCT/CN2020/073127, Jul. 27, 2021, 5 pgs.

Tencent Technology, SG Office Action, Singapore Patent Application No. 11202101120X, dated Jul. 26, 2022, 6 pgs.

* cited by examiner

DATA PROCESSING METHOD AND APPARATUS, COMPUTER DEVICE, AND STORAGE MEDIUM

CROSS REFERENCE TO RELATED APPLICATIONS

This application is a continuation application of U.S. patent application Ser. No. 17/146,937, entitled "DATA PROCESSING METHOD AND APPARATUS, COMPUTER DEVICE, AND STORAGE MEDIUM" filed on Jan. 12, 2021, now U.S. Pat. No. 11,574,290, issued on Feb. 7, 2023, which is a continuation application of PCT Patent Application No. PCT/CN2020/073127, entitled "DATA PROCESSING METHOD AND APPARATUS, COMPUTER DEVICE, AND STORAGE MEDIUM" filed on Jan. 20, 2020, which claims priority to Chinese Patent Application No. 201910063326.1, filed with the State Intellectual Property Office of the People's Republic of China on Jan. 23, 2019, and entitled "DATA PROCESSING METHOD AND APPARATUS, COMPUTER DEVICE, AND STORAGE MEDIUM", all of which are incorporated herein by reference in their entirety.

FIELD OF THE TECHNOLOGY

This application relates to the field of computer technologies, and in particular, to a data processing method and apparatus, a computer device, and a storage medium.

BACKGROUND OF THE DISCLOSURE

With the rapid development of science and technologies, various technologies are progressing by leaps and bounds, and a lot of advanced technologies are constantly emerging. A blockchain technology belongs to a quite important technology in the present era, and has been applied to quite a lot of scenarios.

In the conventional method, a blockchain is mainly used for account reconciliation, that is, for storing transaction records. Once stored in a blockchain, a transaction record cannot be deleted and tampered with, ensuring the stored transaction record to be real and effect. However, in some cases, not all transaction records in a blockchain need to be maintained all the time, but only some transaction records are maintained. For example, transaction records for which account reconciliation has been completed may not be maintained, but only transaction records for which account reconciliation has not been completed are maintained. However, based on the characteristics that data in the blockchain cannot be deleted and tampered with, in the conventional method, transaction records that do not need to be maintained cannot be deleted. Consequently, the unnecessary data occupies a lot of space, and therefore, a lot of storage resources are wasted.

SUMMARY

On the basis of this, this application provides a data processing method and apparatus, a computer device, and a storage medium, to save storage resources in a blockchain.

According to a first aspect of this application, a data processing method is provided and performed by a blockchain node having a processor and a memory storing a plurality of computer programs to be executed by the processor, and the method includes:

detecting, for each block in a first block file, a to-be-maintained transaction record in the block;
selecting, from a hash tree of the block, nodes used for proving that the transaction record belongs to the block;
constructing a node maintenance tree according to the selected nodes;
storing the transaction record at a corresponding leaf node of the node maintenance tree;
updating an association between a block head of the block and the node maintenance tree storing the transaction record to a second block file, the block head of the block being adjacent to a block head of a previous block in the second block file; and
deleting the first block file after the update processing for the each block is completed.

According to a second aspect of this application, a data processing apparatus is provided, the apparatus is applied to a blockchain node, and the apparatus includes:

a node maintenance module, configured to: detect, for each block in a first block file, a to-be-maintained transaction record in the block; select, from a hash tree of the block, nodes used for proving that the transaction record belongs to the block; and construct a node maintenance tree according to the selected nodes;
a transaction storage module, configured to store the transaction record at a corresponding leaf node of the node maintenance tree;
a block update module, configured to update an association between a block head of the block and the node maintenance tree storing the transaction record to a second block file, the block head of the block being adjacent to a block head of a previous block in the second block file; and
a deletion module, configured to delete the first block file after the update processing for the each block is completed.

According to a third aspect of this application, a computer device is provided, including a memory and a processor, the memory storing a plurality of computer programs, the computer programs, when executed by the processor, causing the processor to perform the following operations:

detecting, for each block in a first block file, a to-be-maintained transaction record in the block;
selecting, from a hash tree of the block, nodes used for proving that the transaction record belongs to the block;
constructing a node maintenance tree according to the selected nodes;
storing the transaction record at a corresponding leaf node of the node maintenance tree;
updating an association between a block head of the block and the node maintenance tree storing the transaction record to a second block file, the block head of the block being adjacent to a block head of a previous block in the second block file; and deleting the first block file after the update processing for the each block is completed.

According to a fourth aspect of this application, a non-transitory computer-readable storage medium is provided, storing a plurality of computer programs, the computer programs, when executed by a processor, causing the processor to perform the following operations:

detecting, for each block in a first block file, a to-be-maintained transaction record in the block;
selecting, from a hash tree of the block, nodes used for proving that the transaction record belongs to the block;
constructing a node maintenance tree according to the selected nodes;

storing the transaction record at a corresponding leaf node of the node maintenance tree;

updating an association between a block head of the block and the node maintenance tree storing the transaction record to a second block file, the block head of the block being adjacent to a block head of a previous block in the second block file; and deleting the first block file after the update processing for the each block is completed.

In the foregoing data processing method and apparatus, computer device, and storage medium, for each block in a first block file, a to-be-maintained transaction record in the block is detected; nodes used for proving that the to-be-maintained transaction record belongs to the block are selected from a hash tree of the block; a node maintenance tree is constructed according to the selected nodes; and the transaction record is stored to a corresponding leaf node of the node maintenance tree. An association between a block head of the block and the node maintenance tree storing the transaction record is updated to a second block file, and the block head is adjacent to a block head of a previous block in the second block file. In the second block file, because the block heads do not change and the block heads are still adjacent successively, the characteristic of head-to-tail connection on the blockchain through hash values is maintained. In this way, according to the transaction record stored in the leaf node of the node maintenance tree, and the node in the node maintenance tree, it may prove that the transaction record belongs to the corresponding original block. That is, the function of an original hash tree for checking data authenticity is still maintained, so that the transaction record maintained in the second block file still cannot be forged or tampered with. The first block file is deleted after the update processing for the each block is completed. The second block file does not store transaction records that do not need to be maintained in the original block, but only stores the to-be-maintained transaction record and the node maintenance tree used for checking authenticity of the transaction record, and therefore greatly saves storage resources compared with the first block file.

DESCRIPTION OF EMBODIMENTS

To make the objectives, technical solutions, and advantages of this application clearer and more comprehensible, this application is further described below in detail with reference to the accompanying drawings and the embodiments. It is to be understood that specific embodiments described herein are merely used for explaining this application, but are not intended to limit this application.

Figure 1:
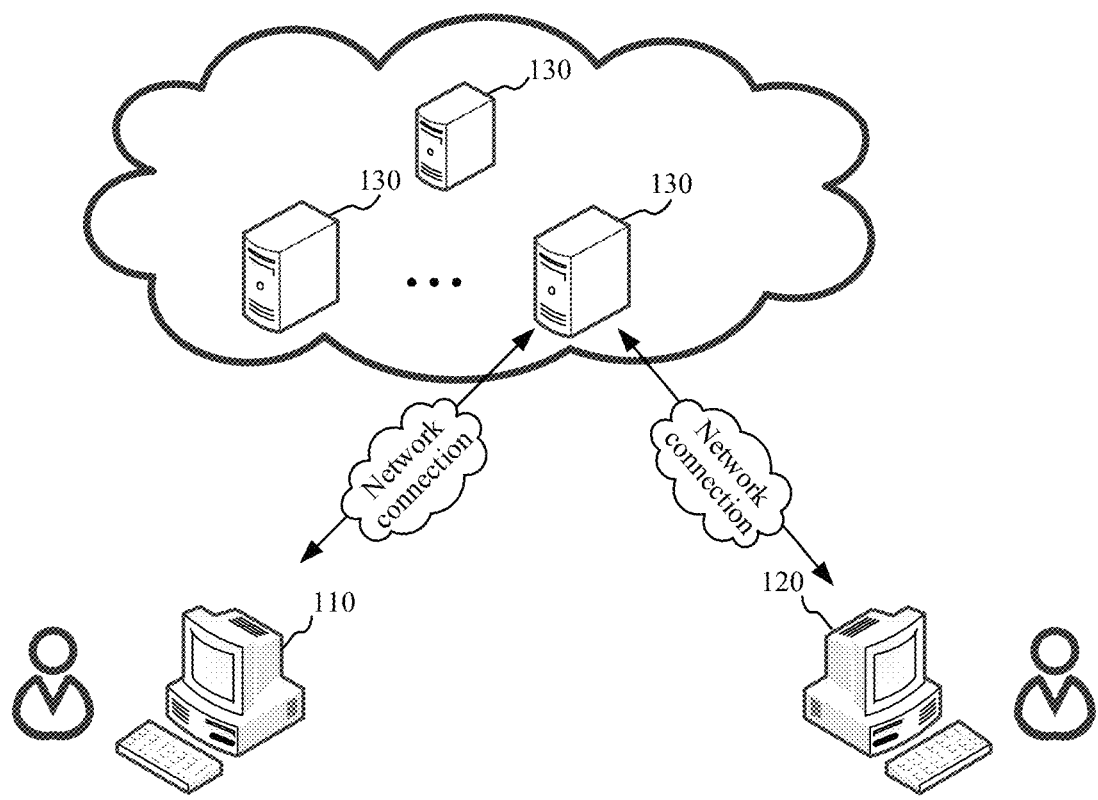
FIG. 1 is a diagram of an application scenario of a data processing method according to an embodiment.

FIG. 1 is a diagram of an application scenario of a data processing method according to an embodiment. Referring to FIG. 1, the application scenario includes a first account reconciliation device 110, a second account reconciliation device 120, and a blockchain node 130 connected through a network. The blockchain node 130 is used for storing a block in a blockchain. The blockchain node 130 is constituted by one or more servers. A plurality of blockchain nodes 130 constitute a blockchain platform. The blockchain platform may be a private blockchain platform or an open blockchain platform. The blockchain platform may be a cloud blockchain platform. The cloud blockchain platform is a platform constructed on a cloud foundation, so that a user can quickly construct a required infrastructure and a blockchain service on an open cloud platform.

The first account reconciliation device 110 and the second account reconciliation device 120 are devices of both account reconciliation parties for implementing account reconciliation. The first account reconciliation device 110 and the second account reconciliation device 120 may be terminals or servers. The terminal may be an intelligent television, a desktop computer, or a mobile terminal, and the mobile terminal may include at least one of a mobile phone, a tablet computer, a notebook computer, a personal digital assistant, and a wearable device. The server may be implemented by an independent server or a server cluster including a plurality of physical servers.

The first account reconciliation device 110 and the second account reconciliation device 120 may store a transaction record for which account reconciliation is to be performed to a blockchain in the blockchain node 130. Blocks on the blockchain are stored in a first block file. The blockchain node 130 may detect, for each block in the first block file, a to-be-maintained transaction record in the block; select, from a hash tree of the block, nodes used for proving that the transaction record belongs to the block; construct a node maintenance tree according to the selected nodes; store the transaction record at a corresponding leaf node of the node maintenance tree; update an association between a block head of the block and the node maintenance tree storing the transaction record to a second block file, the block head of the block being adjacent to a block head of a previous block in the second block file; and delete the first block file after the update processing for the each block is completed. The second block file stores the to-be-maintained transaction record after each block is updated and removes transaction records that do not need to be maintained, thereby saving storage space. In addition, block heads of all blocks in the second block file are still adjacent according to a sequence in the first block file, that is, the characteristic of head-to-tail connection on the blockchain through hash values is still maintained. Therefore, the transaction record maintained in the second block file still cannot be forged and tampered with.

FIG. 1 shows only an application scenario of a data processing method in this application. The data processing method in this application not only properly clears transaction records in an account reconciliation scenario in FIG. 1, but also may clear transaction records stored in other scenarios.

Figure 2:
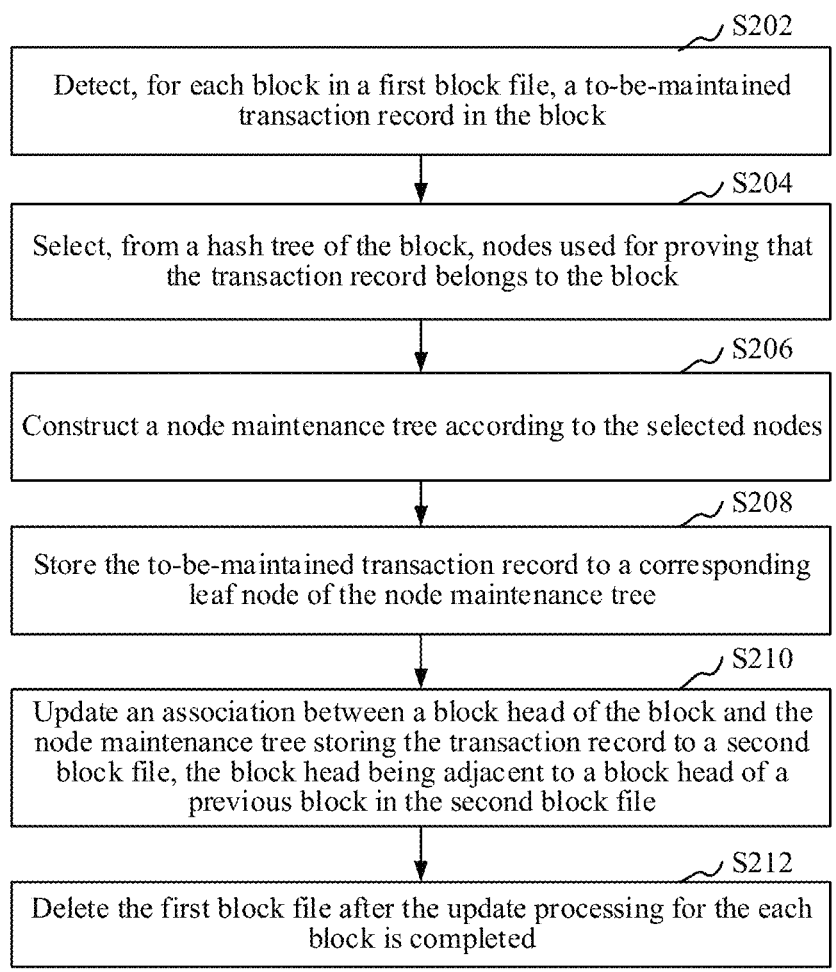
FIG. 2 is a schematic flowchart of a data processing method according to an embodiment.

FIG. 2 is a schematic flowchart of a data processing method according to an embodiment. In this embodiment, description is made mainly by using an example in which the data processing method is applied to the blockchain node 130 in FIG. 1. Referring to FIG. 2, the method specifically includes the following steps:

S202. Detect, for each block in a first block file, a to-be-maintained transaction record in the block.

The to-be-maintained transaction record is a transaction record that does not need to be cleared. The first block file is a file of an original blockchain stored on a blockchain node. The first block file includes a plurality of blocks constituting the blockchain. Each block may include one or more transaction records. There may be one or more transaction records to be maintained.

In an embodiment, the transaction record may be a transaction record used for account reconciliation. In other embodiments, the transaction record may alternatively be a transaction record purely used for storing backups. It may be understood that, the transaction record may alternatively be a transaction record that needs to be used in other usage scenarios. This is not limited herein.

In an embodiment, for each block in the first block file, the blockchain node may detect a to-be-maintained transaction record directly specified in the block.

In an embodiment, the blockchain node may alternatively analyze the transaction records in the blocks, to determine the to-be-maintained transaction record. In some embodiments, the blockchain node may obtain states of the transaction records in the block, to determine a transaction record in an effective state as the to-be-maintained transaction record. The blockchain node may alternatively select a transaction record in a set for which account reconciliation is unsuccessful in the block, to obtain the to-be-maintained transaction record.

It may be understood that, the blockchain node may perform steps S202 to S210 block by block from the first block in the first block file. The blockchain node may alternatively perform steps S202 to S210 concurrently for the blocks in the first block file. This is not limited herein.

The blockchain node may detect a to-be-maintained transaction record from the block or may detect that there is no to-be-maintained transaction record in the block. Therefore, in response to detecting a to-be-maintained transaction record from the block, steps S204 to S210 are performed, and in response to detecting that there is no to-be-maintained transaction record in the block, a block head of a previous block adjacent to a block head of the block may be only updated to a second block file. For example, for a block in which there is no to-be-maintained transaction record, the blockchain node may determine a block head of a previous block of the block in the second block file, and update and store a block head of the block after the block head of the previous block is updated and stored to the second block file. That is, for a block in which there is no to-be-maintained transaction record, the second block file may maintain only block heads but does not need to maintain any transaction record.

S204. Select, from a hash tree of the block, nodes used for proving that the transaction record belongs to the block.

The hash tree of the block is a hash tree generated according to the transaction records in the block. Leaf nodes of the hash tree are in a one-to-one correspondence with hash values of the transaction records in the block. A hash value of a root node of the hash tree is calculated according to hash values of the leaf nodes. The hash value of the root node of the hash tree uniquely corresponds to the block.

The node used for proving that the to-be-maintained transaction record belongs to the block refers to a node corresponding to a hash value required when the hash value of the root node is calculated from the hash values of the leaf nodes corresponding to the to-be-maintained transaction record. It may be understood that, because the hash value of the root node needs to be calculated from the hash values of the leaf nodes corresponding to the to-be-maintained transaction record, the selected nodes include the leaf nodes and the root node corresponding the to-be-maintained transaction record.

In an embodiment, the hash tree may be a double-layer hash tree. The double-layer hash tree refers to a two-hierarchical hash tree including a root node and leaf nodes. A hash value of the root node of the double-layer hash tree may be obtained by performing a hash operation after hash values of all leaf nodes are connected in series and combined. It may be understood that, when the hash tree is a double-layer hash tree, the selected nodes used for proving that the transaction record belongs to the block are all nodes of the hash tree.

In another embodiment, the hash tree may alternatively be a multi-layer hash tree. The multi-layer hash tree refers to a hash tree with a hierarchy greater than two. In this case, the node used for proving that the transaction record belongs to the block is only some nodes of the multi-layer hash tree. In an embodiment, the multi-layer hash tree may be a Merkle tree. The Merkle tree is a multi-hierarchical tree form data structure. Leaf nodes of the Merkle tree use hash values of transaction records as labels, but the leaf node uses a hash value obtained by performing a hash operation after labels of child nodes of the leaf node are connected in series as a label. It may be understood that, a root node of the Merkle tree uses a hash value obtained by performing a hash operation after labels of nodes at the hierarchy nearest to the root node are connected in series as a label.

When there are a plurality of to-be-maintained transaction records, for each to-be-maintained transaction record, nodes used for proving that the to-be-maintained transaction record belongs to the block are selected from the hash tree of the block. It may be understood that, the nodes selected for the plurality of to-be-maintained transaction records may have duplications.

S206. Construct a node maintenance tree according to the selected nodes.

The selected nodes are to-be-maintained nodes in an original hash tree. The node maintenance tree is a hash tree reconstructed according to the selected to-be-maintained nodes.

When there is only one to-be-maintained transaction record, the node maintenance tree may be constructed only according to nodes selected for the transaction record. When there are a plurality of to-be-maintained transaction records, nodes selected for the plurality of to-be-maintained transaction records may be gathered and deduplicated, and then the node maintenance tree is reconstructed according to the deduplicated nodes. The constructed node maintenance tree maintains the hierarchical relationship of the selected nodes in the original hash tree.

Figure 3:
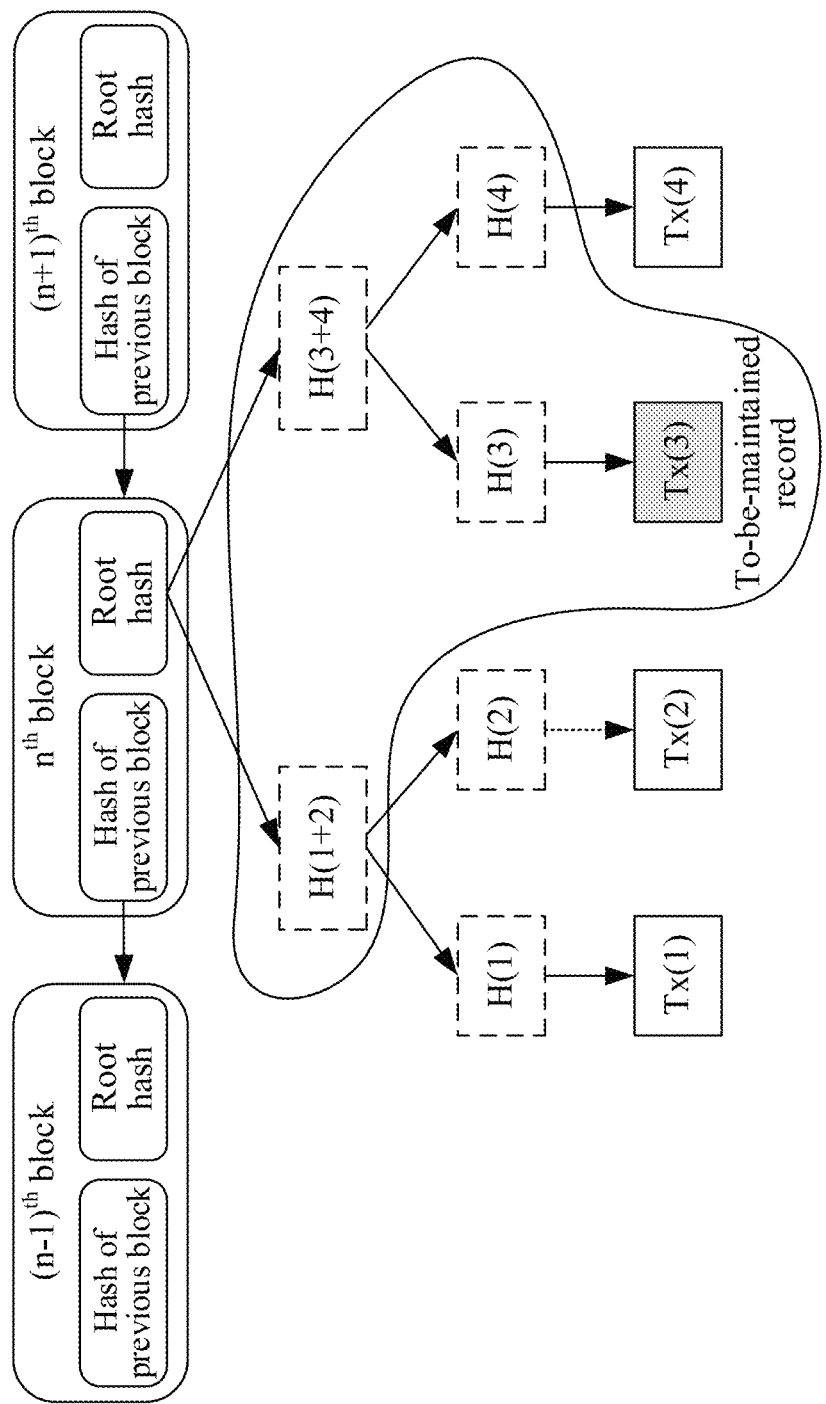
FIG. 3 is a schematic diagram of a principle of constructing a node maintenance tree according to an embodiment.

For ease of understanding, the node maintenance tree is described by using an example with reference to FIG. 3. Referring to FIG. 3, a block head of an $(n-1)^{th}$ block includes a hash value of a previous block and a root hash of the $(n-1)^{th}$ block. The root hash in FIG. 3 refers to the root node of the Merkle tree, a block head of an $n^{th}$ block includes a hash value of the $(n-1)^{th}$ block and a root hash of the $n^{th}$ block, and a block head of an $(n+1)^{th}$ block includes a hash value of the $n^{th}$ block and a root hash of the $(n+1)^{th}$ block. Using the $n^{th}$ block as an example, assuming that the $n^{th}$ block includes four transaction records Tx(1) to Tx(4), a hash operation is performed on Tx(1) to Tx(4) separately, to obtain corresponding hash values H(1) to H(4). Therefore, a hash tree including leaf nodes H(1) to H(4), H(1+2), and H(3+4), and the root node may be generated by using the four transaction records. H(1+2) is the father node of H(1) and H(2), and a hash value corresponding to H(1+2) is obtained by performing a hash operation after H(1) and H(2) are connected in series. H(3+4) is the father node of H(3) and H(4), and a hash value corresponding to H(3+4) is obtained by performing a hash operation after H(3) and H(4) are connected in series. The root node is the father node of H(1+2) and H(3+4), and a hash value corresponding to the root node is obtained by performing a hash operation after H(1+2) and H(3+4) are connected in series.

For the $n^{th}$ block, assuming that it is detected that the transaction record Tx(3) is a to-be-maintained transaction record, and the remaining transaction records are transaction records that do not need to be maintained, nodes used for proving that Tx(3) belongs to the block may be selected. As shown in FIG. 3, the circled nodes are to-be-selected nodes in addition to the root node. That is, in addition to the root node, the nodes H(1+2), H(3+4), H(3), and H(4) need to be further selected, to construct the node maintenance tree. In another example, assuming that it is detected that the transaction records Tx(2) and Tx(3) are to-be-maintained transaction records, nodes used for proving that Tx(2) and Tx(3) belong to the block may be selected separately. It may be understood that, the nodes selected for Tx(2) definitely also include H(1+2) and H(3+4). Therefore, the nodes selected for Tx(2) and Tx(3) need to be gathered and deduplicated. After the deduplication, all nodes in the entire hash tree are equivalently selected to construct the node maintenance tree. Then, Tx(2) and Tx(3) are only stored in corresponding respective leaf nodes.

S208. Store the to-be-maintained transaction record at a corresponding leaf node of the node maintenance tree.

In some embodiments, the blockchain node may store the to-be-maintained transaction record to a data block corresponding to a corresponding leaf node in the node maintenance tree.

Similarly, using FIG. 3 as an example, in the node maintenance tree, the blockchain node may store the transaction record Tx(3) to a data block corresponding to the corresponding leaf node H(3).

S210. Update an association between a block head of the block and the node maintenance tree storing the transaction record to a second block file, the block head being adjacent to a block head of a previous block in the second block file.

It may be understood that, the second block file is different from the first block file, and is a block file newly created on the blockchain node.

In some embodiments, the blockchain node may serialize the block head of the block and the node maintenance tree storing the transaction record, and transform the block head of the block and the node maintenance tree storing the transaction record into a storable form. The blockchain node may determine a block head of a previous block of the block in the second block file. The block head of the previous block adjacent to the serialized block head of the block is updated to the second block file, and an association between the serialized node maintenance tree storing the to-be-maintained transaction record and the block head of the block is stored to the second block file.

In an embodiment, the method further includes: obtaining a second storage position of the second block file; and modifying a position index of the block from pointing to a first storage position of the first block file to pointing to the second storage position.

The position index of the block refers to an index used for searching for a storage position of the block.

It may be understood that, the position index of the block initially points to the first storage position of the first block file, and after the blockchain node updates the block to the second block file according to steps S204 to 210, the position index of the block may be modified to point to the second storage position of the second block file. In this way, the block may be found subsequently from the second block file according to the position index pointing to the second storage position.

Because there is a consensus mechanism between the blockchain nodes, after reaching consensus, the blockchain nodes update the association between the block head of the block and the node maintenance tree storing the transaction record to the second block file.

S212. Delete the first block file after the update processing for the each block is completed.

It may be understood that, for the block in which there is a to-be-maintained transaction record in the first block file, the association between the block head of the previous block adjacent to the block head of the block and the node maintenance tree storing the to-be-maintained transaction record may be updated to the second block file by performing steps S204 to S210. For the block in which there is no to-be-maintained transaction record, the block head of the block may be updated and stored to the second block file after the block head of the previous block is updated and stored. The content of each block stored in the second block file is equivalent to the content obtained after the block is updated. Therefore, after each block in the first block file is updated completely, a second block file including the updated block may be obtained, and then the first block file may be deleted.

Because there is a consensus mechanism between the blockchain nodes, after reaching consensus, the blockchain nodes delete the first block file.

In the foregoing embodiment, because the block heads do not change and the block heads are still adjacent successively, the characteristic of head-to-tail connection on the blockchain through hash values is maintained. In this way, according to the transaction record stored in the leaf node of the node maintenance tree, and the node in the node maintenance tree, it may prove that the transaction record belongs to the corresponding original block. That is, the function of an original hash tree for checking data authenticity is still maintained, so that the transaction record maintained in the second block file still cannot be forged or tampered with. The first block file is deleted after the update processing for the each block is completed. The second block file does not store transaction records that do not need to be maintained in the original block, but only stores the to-be-maintained transaction record and the node maintenance tree used for checking authenticity of the transaction record, and therefore greatly saves storage resources compared with the first block file.

In an embodiment, the transaction record is a transaction record used for account reconciliation. Step S202 includes: comparing, for each block in the first block file, a transaction record in the block with a transaction record in a set for which account reconciliation is unsuccessful; and determining, in response to that the transaction record in the block is included in the set for which account reconciliation is unsuccessful, that the transaction record is a to-be-maintained transaction record.

The set for which account reconciliation is unsuccessful is a set formed by transaction records for which account reconciliation is unsuccessful.

In an embodiment, the set for which account reconciliation is unsuccessful may be a set including both transaction records for which no account reconciliation is performed and transaction records for which account reconciliation is failed.

In an embodiment, the set for which account reconciliation is unsuccessful may include an account-unreconciled set or an account reconciliation error set.

In an embodiment, the set for which account reconciliation is unsuccessful may include two subsets: an account-unreconciled set and an account reconciliation error set.

The account-unreconciled set is a set formed by transaction records for which account reconciliation processing has not been performed. The account reconciliation error set is a set formed by transaction records with inconsistent account reconciliation (that is, an error occurs in account reconciliation).

In some embodiments, the blockchain node may separately compare each transaction record in the block with the transaction records in the set for which account reconciliation is unsuccessful, to determine whether the set for which account reconciliation is unsuccessful includes the transaction record in the block. In response to that the comparison between the transaction record in the block and the transaction records in the set for which account reconciliation is unsuccessful is consistent, it indicates that the transaction record is included in the set for which account reconciliation is unsuccessful, and the transaction record in the block and included in the set for which account reconciliation is unsuccessful may be determined as a to-be-maintained transaction record. In response to that the comparison between the transaction record in the block and the transaction records in the set for which account reconciliation is unsuccessful is inconsistent, it indicates that the transaction record is not in the set for which account reconciliation is unsuccessful, and the transaction record may be determined as a transaction record that does not need to be maintained.

In the foregoing embodiment, the set for which account reconciliation is unsuccessful is set on the blockchain, and the transaction record in the block is compared with the transaction records in the set for which account reconciliation is unsuccessful, so that the to-be-maintained transaction record can be determined more quickly.

In an embodiment, the set for which account reconciliation is unsuccessful includes an account-unreconciled set. The method further includes an account reconciliation step, and the account reconciliation step may include the following steps:

S402. Store, in response to receiving an account reconciliation call request transmitted by a first account reconciliation device, a first transaction record for which account reconciliation is to be performed and that is carried in the account reconciliation call request to the block in the first block file through a smart contract.

The account-unreconciled set is a set formed by transaction records for which account reconciliation processing has not been performed. The first account reconciliation device is a device used by one party initiating account reconciliation processing. The account reconciliation call request is used for requesting to call a smart contract on the blockchain, to implement account reconciliation processing.

The smart contract is a piece of code set on a blockchain obtained by programming a protocol that is formulated jointly by the blockchain nodes and that is used for clarifying rights and obligations. The code contains conditions that trigger automatic execution of a contract. It may be understood that, when a trigger condition for an event is reached, after the blockchain nodes reach consensus on the event, the smart contract may automatically execute the event.

It may be understood that, the blockchain nodes pre-create an account-unreconciled set used for storing transaction records for which account reconciliation has not been performed. The initially created account-unreconciled set may be a null set, and does not include any transaction record.

In some embodiments, when both account reconciliation parties perform account reconciliation, an account reconciliation call request may be transmitted to the blockchain nodes through respective account reconciliation devices, to request to call the smart contract set on the blockchain node. In response to that the blockchain node receives the account reconciliation call request transmitted by the first account reconciliation device, the account reconciliation call request may be parsed through the smart contract, to obtain a first transaction record for which account reconciliation is to be performed. The blockchain node may store the first transaction record to the block in the first block file through the smart contract.

It may be understood that, when receiving the account reconciliation call request transmitted by the account reconciliation device used by any party of the both account reconciliation parties, the blockchain node may store the transaction record carried in the account reconciliation call request to the block in the first block file through the smart contract.

S404. Obtain, through the smart contract, an account reconciliation association identifier corresponding to the first transaction record.

The account reconciliation association identifier is used for associating and marking transaction records that are transmitted by account reconciliation devices used by the both account reconciliation parties and that represent the same transaction.

In an embodiment, the account reconciliation association identifier may include a transaction serial number. Therefore, account reconciliation processing needs to be performed between the transaction records that correspond to the same transaction serial number and that are transmitted by the both account reconciliation parties. It may be understood that, in other embodiments, the account reconciliation association identifier may alternatively be other identifiers that can uniquely represent the same transaction.

It may be understood that, the blockchain node may extract the account reconciliation association identifier from the first transaction record through the smart contract. The blockchain node may alternatively extract, from the account reconciliation call request, the account reconciliation association identifier corresponding to the first transaction record through the smart contract.

S406. Search an account-unreconciled set created on a blockchain for a second transaction record of a second account reconciliation device corresponding to the account reconciliation association identifier.

The second account reconciliation device is a device used by the other party initiating the account reconciliation processing.

Specifically, the blockchain node may search the transaction records of the account-unreconciled set through the smart contract for a second transaction record corresponding to the account reconciliation association identifier. The second transaction record is a transaction record carried when the second account reconciliation device used by the other party initiating the account reconciliation processing transmits an account reconciliation call request.

S408. Add the first transaction record and the account reconciliation association identifier corresponding to the first transaction record to the account-unreconciled set in response to not finding the second transaction record.

It may be understood that, both account reconciliation parties are not completely synchronous when calling the smart contract to perform account reconciliation, and definitely vary in speed, and sequences of transaction records selected for account reconciliation may also be different. When one account reconciliation party transmits a transaction record for which account reconciliation is to be performed to the smart contract, the other party may have not transmitted a transaction record corresponding to the same account reconciliation association identifier to the smart contract. Therefore, it is possible that the second transaction record of the second account reconciliation device corresponding to the account reconciliation association identifier is not found. Similarly, if the other party first transmits a transaction record for which account reconciliation is to be performed to the smart contract, no transaction record corresponding to the same account reconciliation association identifier can be found for the transaction record transmitted first. As a result, account reconciliation cannot be performed. Therefore, the transaction record transmitted first is added to the account-unreconciled set.

Therefore, from the account-unreconciled set, the blockchain node may find the second transaction record of the second account reconciliation device corresponding to the account reconciliation association identifier, or may not find the second transaction record of the second account reconciliation device corresponding to the account reconciliation association identifier.

The blockchain node may add the first transaction record and the account reconciliation association identifier corresponding to the first transaction record to the account-unreconciled set in response to not finding the second transaction record.

In an embodiment, in response to finding the second transaction record of the second account reconciliation device corresponding to the account reconciliation association identifier, the blockchain node may delete the second transaction record from the account-unreconciled set, and compare the first transaction record with the second transaction record. In response to that the comparison is inconsistent, distinctive processing may be performed on the first transaction record and the second transaction record and transaction records for which account reconciliation is successful. The distinctive processing refers to processing that sets apart the first transaction record and the second transaction record from the transaction records for which account reconciliation is successful.

In an embodiment, the blockchain node may add an account reconciliation failure mark to the first transaction record and the second transaction record for which the comparison is inconsistent. It may be understood that, the blockchain node may alternatively perform distinctive processing on the first transaction record and the second transaction record for which the comparison is inconsistent and the transaction records for which account reconciliation is successful in other manners.

In the foregoing embodiment, the account-unreconciled set is set on the blockchain, and when the account reconciliation call request is received, real-time account reconciliation processing is implemented in combination with the account-unreconciled set, so that the account reconciliation is more timely and convenient.

Figure 4:
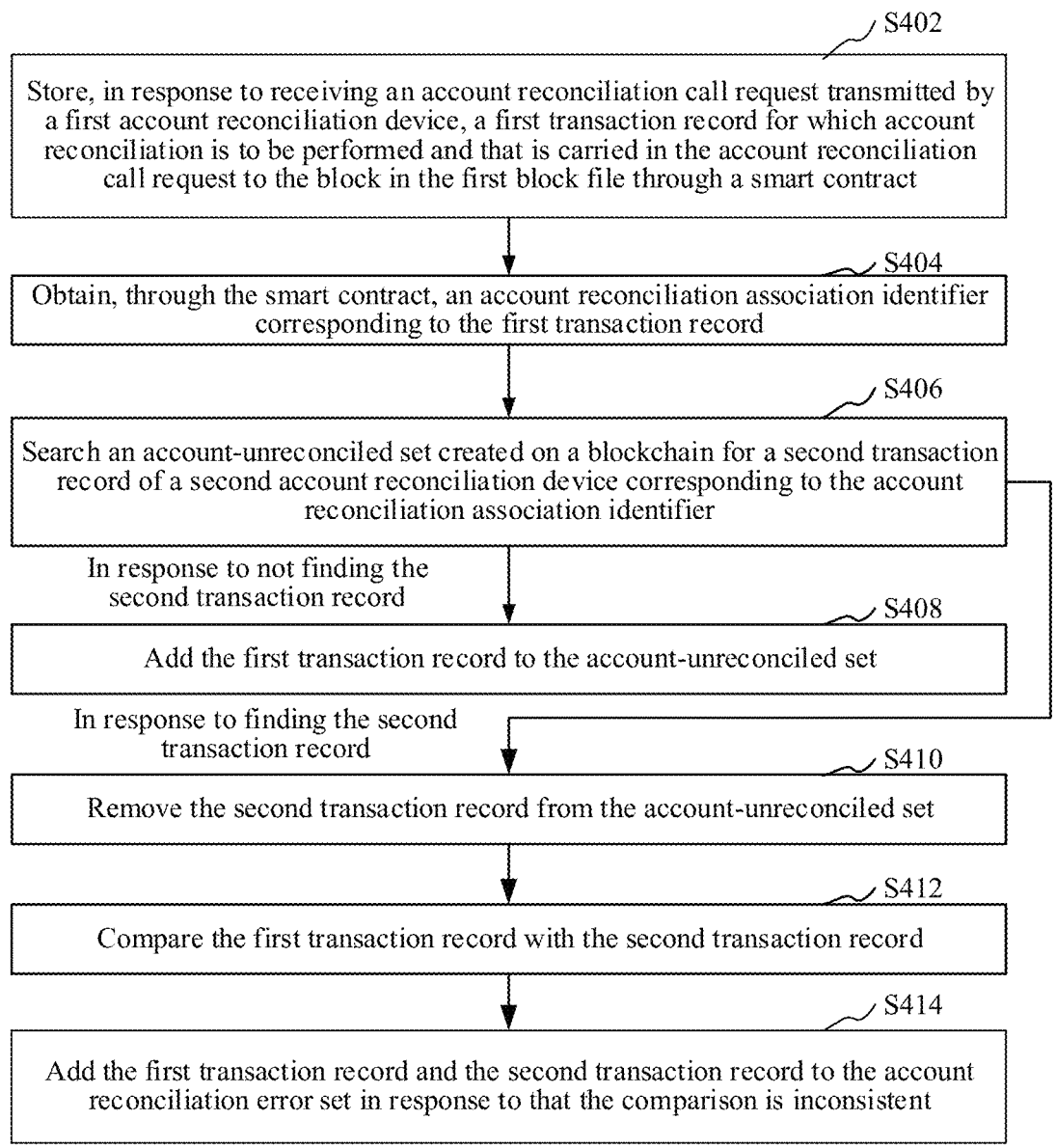
FIG. 4 is a schematic flowchart of an account reconciliation step according to an embodiment.

As shown in FIG. 4, in an embodiment, the set for which account reconciliation is unsuccessful further includes an account reconciliation error set. In addition to steps S402 to 408, the account reconciliation step further includes the following steps:

S410. Remove the second transaction record from the account-unreconciled set in response to finding the second transaction record.

S412. Compare the first transaction record with the second transaction record.

In some embodiments, in response to finding the second transaction record in the account-unreconciled set, the blockchain node deletes the second transaction record from the account-unreconciled set, and compares the second transaction record with the first transaction record, to compare whether the second transaction record and the first transaction record are consistent.

S414. Add the first transaction record and the second transaction record to the account reconciliation error set in response to that the comparison is inconsistent. In some embodiments, the account reconciliation association identifier corresponding to the first transaction record and the account reconciliation association identifier corresponding to the second transaction record are also added to the account reconciliation error set.

The account reconciliation error set is a set formed by transaction records for which account reconciliation is inconsistent.

It may be understood that, the result for comparing the second transaction record with the first transaction record includes that the comparison is consistent and the comparison is inconsistent. In response to that the comparison is consistent, it is determined that the first transaction record and the second transaction record belong to transaction records for which account reconciliation is successful. In response to that the comparison is inconsistent, it indicates that the first transaction record and the second transaction record belong to transaction records for which account reconciliation is failed, and the first transaction record and the second transaction record may be added to the account reconciliation error set.

In an embodiment, the blockchain node may receive modification processing for the transaction records in the account reconciliation error set, and perform account reconciliation comparison processing on the modified transaction records again.

In the foregoing embodiment, two types of sets for which account reconciliation is unsuccessful, that is, the account-unreconciled set and the account reconciliation error set, are set on the blockchain. It is quite convenient to perform real-time account reconciliation through the two types of sets, and an account reconciliation result can be managed more accurately.

In an embodiment, step S204 includes: determining, in the hash tree of the block, a leaf node corresponding to the transaction record; selecting a first ancestor node and a sibling leaf node of the leaf node from the hash tree; selecting, for a non-sibling leaf node of the leaf node, a second ancestor node of the non-sibling leaf node nearest to a root node; and constructing a node maintenance tree according to the leaf node, the first ancestor node, the sibling leaf node, and the second ancestor node.

The leaf node corresponding to the transaction record refers to a leaf node with a hash value of a to-be-maintained transaction record as a label. The ancestor node refers to a node in an ancestor relationship with the leaf node. It may be understood that, a father node, a grandfather node, and a great-grandfather node all belong to ancestor nodes of the leaf node. The sibling leaf node refers to a leaf node corresponding to the same father node as the leaf node. The non-sibling leaf node refers to a leaf node not having the same father node as the leaf node.

In some embodiments, the blockchain node may select, from the hash tree, a first ancestor node of a leaf node corresponding to the to-be-maintained transaction record and a sibling leaf node of the leaf node. It may be understood that, the first ancestor node refers to all ancestor nodes of the leaf node. Because the root node is definitely an ancestor node of the leaf node corresponding to the to-be-maintained transaction record, the first ancestor node includes the root node. The blockchain node may determine, from the hash tree, a non-sibling leaf node of the leaf node corresponding to the transaction record, and determine an ancestor node of the non-sibling leaf node nearest to the root node, to obtain a second ancestor node. It may be understood that, there may be one or more non-sibling leaf nodes. When ancestor nodes of a plurality of non-sibling leaf nodes nearest to the root node are different, each ancestor node nearest to the root node is selected. When ancestor nodes of a plurality of non-sibling leaf nodes nearest to the root node are the same, only the ancestor node nearest to the root node may be selected.

The blockchain node may construct the node maintenance tree according to the leaf node, the first ancestor node, the sibling leaf node, and the second ancestor node.

Explanation and description are provided with reference to FIG. 3. For example, a to-be-maintained transaction record is Tx(3), a leaf node corresponding to the to-be-maintained transaction record is H(3), a sibling leaf node of H(3) is H(4), and first ancestor nodes of H(3) are H(3+4) and the root node. H(1) and H(2) are non-sibling leaf nodes of H(3), and second ancestor nodes of the non-sibling leaf nodes H(1) and H(2) nearest to the root node both are H(1+2). Therefore, the blockchain node may construct a node maintenance tree according to the leaf nodes H(3), H(4), H(3+4), and H(1+2) corresponding to Tx(3), and the root node.

In the foregoing embodiment, the node maintenance tree is constructed according to the leaf node, the first ancestor node, the sibling leaf node, and the second ancestor node corresponding to the to-be-maintained transaction record on the original hash tree, so that while maintaining the function of the original hash tree for checking data authenticity, unnecessary nodes and transaction record data can be eliminated, and storage resources are saved to some extent.

Figure 5:
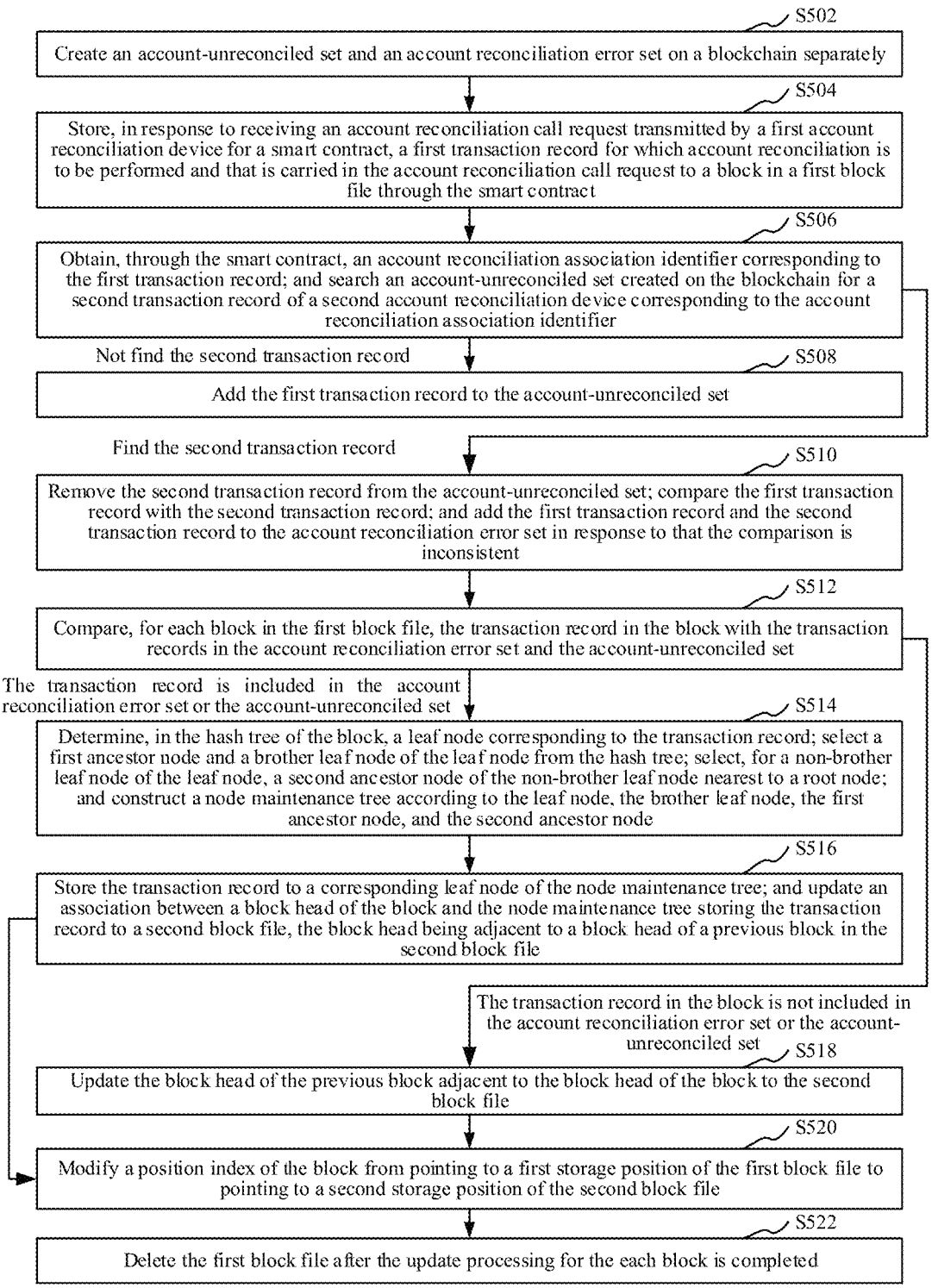
FIG. 5 is a schematic flowchart of a data processing method according to another embodiment.

As shown in FIG. 5, in an embodiment, a data processing method is provided, and the data processing method specifically includes the following steps:

S502. Create an account-unreconciled set and an account reconciliation error set on a blockchain separately.

The initially created account-unreconciled set and account reconciliation error set may be null sets, and do not include transaction records, and subsequently, corresponding transaction records are added according to actual account reconciliation situations.

It may be understood that, the account-unreconciled set and the account reconciliation error set are equivalent to state data of the blockchain.

S504. Store, in response to receiving an account reconciliation call request transmitted by a first account reconciliation device for a smart contract, a first transaction record for which account reconciliation is to be performed and that is carried in the account reconciliation call request to a block in a first block file through the smart contract.

S506. Obtain, through the smart contract, an account reconciliation association identifier corresponding to the first transaction record; and search an account-unreconciled set created on the blockchain for a second transaction record of a second account reconciliation device corresponding to the account reconciliation association identifier. In response to not finding the second transaction record, step S508 is performed, and in response to finding the second transaction record, step S510 is performed.

S508. Add the first transaction record and the account reconciliation association identifier corresponding to the first transaction record to the account-unreconciled set.

The account reconciliation association identifier is used for associating and marking transaction records that are transmitted by account reconciliation devices used by both account reconciliation parties and that represent the same transaction.

It may be understood that, the blockchain generates blocks sequentially from the first block, to store transaction records. Therefore, transaction records included in the account-unreconciled set in S506 are transaction records for which account reconciliation has not been performed until the first transaction record is stored to the block. For example, if the first four blocks in the first block file are full, a first transaction record R1 is stored to a fifth block. Therefore, the account-unreconciled set includes transaction records for which account reconciliation has not been performed up to the fifth block. The blockchain node may search the current account-unreconciled set for a second transaction record R2 corresponding to the same account reconciliation association identifier as the first transaction record R1. If there is no second transaction record R2, the first transaction record R1 may be added to the account-unreconciled set.

S510. Remove the second transaction record from the account-unreconciled set; compare the first transaction record with the second transaction record; and add the first transaction record and the second transaction record to the account reconciliation error set in response to that the comparison is inconsistent.

Similarly, the blockchain generates blocks sequentially from the first block, to store transaction records. Therefore, transaction records included in the account reconciliation error set to which the first transaction record and the second transaction record are added are transaction records for which an error occurs in account reconciliation until the first transaction record is stored to the block.

It may be understood that, steps S504 to S510 describe a real-time account reconciliation process, that is, the blockchain node may store the first transaction record carried in the account reconciliation call request of the first account reconciliation device to the block while performing account reconciliation processing on the first transaction record, thereby implementing real-time account reconciliation processing of storage and account reconciliation at the same time.

The "first account reconciliation device" and the "second account reconciliation device" herein are only used for distinguishing, but not for other limitations. It may be understood that, after receiving an account reconciliation call request of any party, the smart contract may store the transaction record carried in the account reconciliation call request to the block.

In addition, because when the both account reconciliation parties are not completely synchronous when performing account reconciliation by calling the smart contract, and definitely vary in speed, and sequences of transaction records selected for account reconciliation may also be different. When one account reconciliation party transmits a transaction record for which account reconciliation is to be performed to the smart contract through an account reconciliation device, and the other account reconciliation party has not transmitted account reconciliation data, transaction record for which account reconciliation is to be performed may be added to the account-unreconciled set.

It may be understood that, when one account reconciliation party transmits a transaction record for which account reconciliation is to be performed to the smart contract, and the other account reconciliation party also has transmitted a transaction record corresponding to the same transaction, different transaction records corresponding to the same transaction may be compared. If the comparison is inconsistent, it indicates that an error occurs in the account reconciliation, and the transaction records for which the comparison is inconsistent may be added to the account reconciliation error set.

S512. Compare, for each block in the first block file, the transaction record in the block with the transaction records in the account reconciliation error set and the account-unreconciled set. In response to that the transaction record in the block is included in the account reconciliation error set or the account-unreconciled set, steps S514 to S516 are performed, and in response to that the transaction record in the block is not included in the account reconciliation error set or the account-unreconciled set, step S518 is performed.

It may be understood that, for each block in the first block file, the blockchain node may perform step S512 (which is equivalent to clearing data in the blockchain regularly) according to a preset cycle. In other embodiments, the blockchain node may also trigger to perform step S512 (which is equivalent to clearing data in the blockchain when there are excessive blocks in the blockchain, and excessively large storage space is occupied) when a quantity of blocks in the first block file reaches a preset quantity threshold.

S514. Determine, in the hash tree of the block, a leaf node corresponding to the transaction record; select a first ancestor node and a sibling leaf node of the leaf node from the hash tree; select, for a non-sibling leaf node of the leaf node, a second ancestor node of the non-sibling leaf node nearest to a root node; and construct a node maintenance tree according to the leaf node, the sibling leaf node, the first ancestor node, and the second ancestor node.

S516. Store the transaction record at a corresponding leaf node of the node maintenance tree; and update an association between a block head of the block and the node maintenance tree storing the transaction record to a second block file, the block head being adjacent to a block head of a previous block in the second block file.

S518. Update the block head of the previous block adjacent to the block head of the block to the second block file.

S520. Modify a position index of the block from pointing to a first storage position of the first block file to pointing to a second storage position of the second block file.

S522. Delete the first block file after the update processing for the each block is completed.

In the foregoing embodiment, in the second block file, because the block heads do not change and the block heads are still adjacent successively, the characteristic of head-to-tail connection on the blockchain through hash values is maintained. In this way, according to the transaction record stored in the leaf node of the node maintenance tree, and the node in the node maintenance tree, it may prove that the transaction record belongs to the corresponding original block. That is, the function of an original hash tree for checking data authenticity is still maintained, so that the transaction record maintained in the second block file still cannot be forged or tampered with. The first block file is deleted after the update processing for the each block is completed. The second block file does not store transaction records that do not need to be maintained in the original block, but only stores the to-be-maintained transaction record and the node maintenance tree used for checking authenticity of the transaction record, and therefore greatly saves storage resources compared with the first block file.

Figure 6:
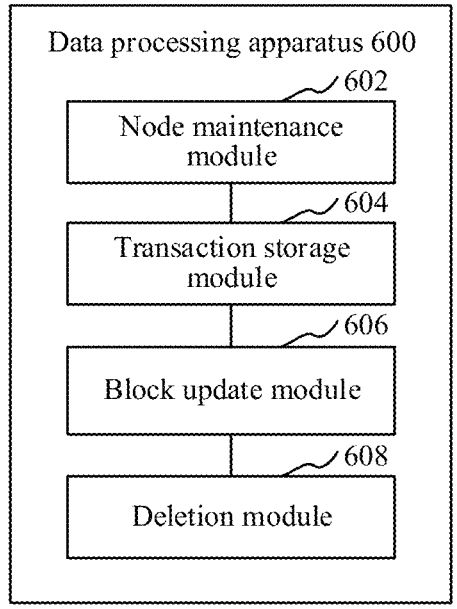
FIG. 6 is a block diagram of a data processing apparatus according to an embodiment.

As shown in FIG. 6, in an embodiment, a data processing apparatus 600 is provided. The apparatus may be implemented as all or a part of a computer device in a manner of hardware or combining hardware and software. In some embodiments, the computer device may be the blockchain node in FIG. 1. The apparatus 600 includes: a node maintenance module 602, a transaction storage module 604, a block update module 606, and a deletion module 608.

The node maintenance module 602 is configured to: detect, for each block in a first block file, a to-be-maintained transaction record in the block; select, from a hash tree of the block, nodes used for proving that the transaction record belongs to the block; and construct a node maintenance tree according to the selected nodes.

The transaction storage module 604 is configured to store the transaction record at a corresponding leaf node of the node maintenance tree.

The block update module 606 is configured to update an association between a block head of the block and the node maintenance tree storing the transaction record to a second block file, the block head of the block being adjacent to a block head of a previous block in the second block file.

The deletion module 608 is configured to delete the first block file after the update processing for the each block is completed.

In an embodiment, the node maintenance module 602 is configured to perform, in response to detecting the to-be-maintained transaction record in the block, the operation of selecting, from a hash tree of the block, nodes used for proving that the transaction record belongs to the block; and the node maintenance module 602 is further configured to instruct, in response to detecting that there is no to-be-maintained transaction record in the block, the block update module 606 to update the block head of the previous block adjacent to the block head of the block to the second block file.

In an embodiment, the transaction record is a transaction record used for account reconciliation; and the node maintenance module 602 is further configured to compare a transaction record in the block with a transaction record in a set for which account reconciliation is unsuccessful; and determine, in response to that the transaction record in the block is included in the set for which account reconciliation is unsuccessful, that the transaction record is a to-be-maintained transaction record.

Figure 7:
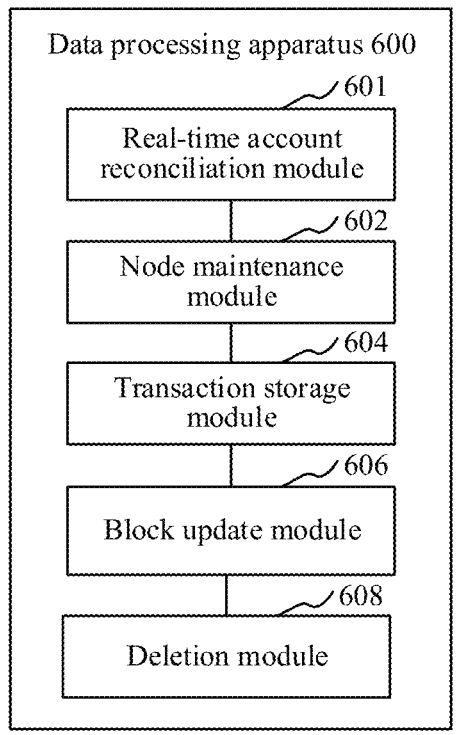
FIG. 7 is a block diagram of a data processing apparatus according to another embodiment.

As shown in FIG. 7, in an embodiment, the set for which account reconciliation is unsuccessful includes an account-unreconciled set. The apparatus 600 further includes:

a real-time account reconciliation module 601, configured to store, in response to receiving an account reconciliation call request transmitted by a first account reconciliation device, a first transaction record for which account reconciliation is to be performed to the block in the first block file through a smart contract, the first transaction record being carried in the account reconciliation call request; obtain, through the smart contract, an account reconciliation association identifier corresponding to the first transaction record; search an account-unreconciled set created on a blockchain for a second transaction record of a second account reconciliation device corresponding to the account reconciliation association identifier; and add the first transaction record and the account reconciliation association identifier corresponding to the first transaction record to the account-unreconciled set in response to not finding the second transaction record.

In an embodiment, the set for which account reconciliation is unsuccessful further includes an account reconciliation error set. The real-time account reconciliation module 601 is further configured to: remove the second transaction record from the account-unreconciled set in response to finding the second transaction record; compare the first transaction record with the second transaction record; and add the first transaction record and the second transaction record to the account reconciliation error set in response to that the comparison is inconsistent.

In an embodiment, the node maintenance module 602 is further configured to: determine, in the hash tree of the block, a leaf node corresponding to the transaction record; select a first ancestor node and a sibling leaf node of the leaf node from the hash tree; select, for a non-sibling leaf node of the leaf node, a second ancestor node of the non-sibling leaf node nearest to a root node; and construct a node maintenance tree according to the leaf node, the first ancestor node, the sibling leaf node, and the second ancestor node.

In an embodiment, the hash tree is a double-layer hash tree, a hash value of a root node of the double-layer hash tree is obtained by performing a hash operation after hash values of all leaf nodes are connected in series and combined, and the selected nodes are all nodes of the hash tree.

In an embodiment, the block update module 606 is further configured to obtain a second storage position of the second block file; and modify a position index of the block from pointing to a first storage position of the first block file to pointing to the second storage position.

Figure 8:
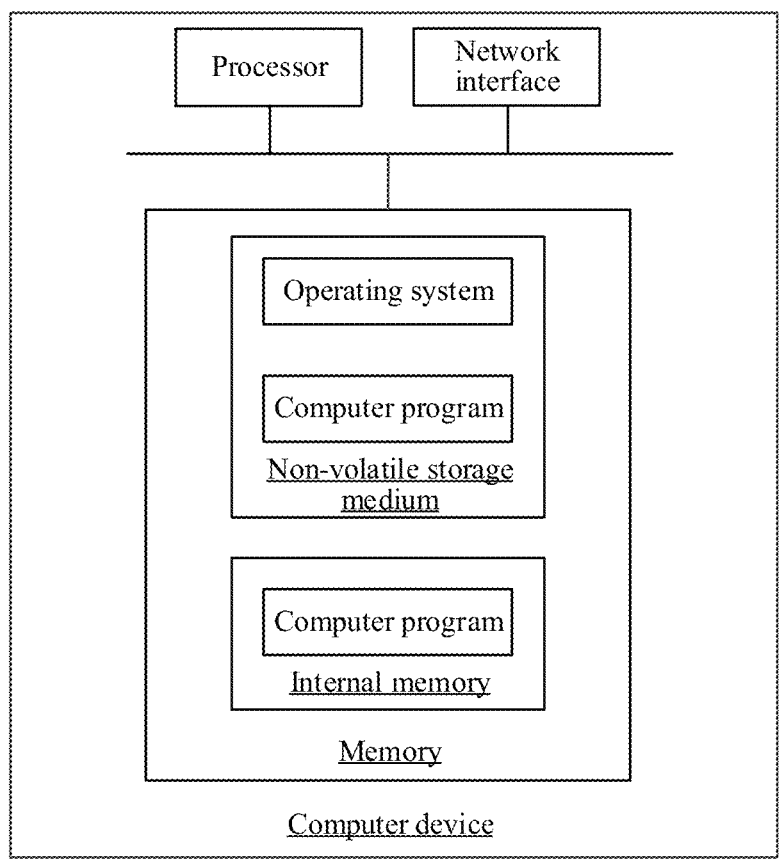
FIG. 8 is a schematic diagram of an inner structure of a computer device according to an embodiment.

FIG. 8 is a schematic diagram of an inner structure of a computer device according to an embodiment. Referring to FIG. 8, the computer device may be each server in the blockchain node 130 shown in FIG. 1. The computer device includes a processor, a memory, and a network interface connected through a system bus. The memory includes a non-volatile storage medium and an internal memory. The non-volatile storage medium of the computer device may store an operating system and a computer program. The computer program, when executed, may cause the processor to perform all or some steps of the data processing method in the foregoing method embodiments. The processor of the computer device is configured to provide calculation and control capabilities, to support running of the entire computer device. The internal memory may store a computer program, and the computer program, when executed by the processor, may cause the processor to perform all or some steps of the data processing method in the foregoing method embodiments. The network interface of the computer device is configured to perform network communication.

A person skilled in the art may understand that the structure shown in FIG. 8 is only a block diagram of a part of the structure related to the solution of this application, and does not constitute a limitation on the computer device to which the solution of this application is applied. The computer device may specifically include more or fewer components than components shown in the figure, or combine some components, or have a different component arrangement.

In an embodiment, the data processing apparatus provided in this application may be implemented in a form of a computer program that may be executed on the computer device shown in FIG. 8. The non-volatile storage medium of the computer device may store program modules constituting the data processing apparatus, such as the node maintenance module 602, the transaction storage module 604, the block update module 606, and the deletion module 608 shown in FIG. 6. The computer program constituted by the program modules is used for making the computer device perform the operations in the data processing method of the embodiments of this application described in this specification. For example, by using the node maintenance module 602 in the data processing apparatus 600 shown in FIG. 6, the computer device may detect, for each block in a first block file, a to-be-maintained transaction record in the block; select, from a hash tree of the block, nodes used for proving that the transaction record belongs to the block; and construct a node maintenance tree according to the selected nodes. The computer device may store the transaction record at a corresponding leaf node of the node maintenance tree by using the transaction storage module 604. The computer device may update an association between a block head of the block and the node maintenance tree storing the transaction record to a second block file by using the block update module 606, the block head of the block being adjacent to a block head of a previous block in the second block file. The computer device may delete the first block file by using the deletion module 608 after the update processing for the each block is completed.

In an embodiment, a computer device is provided, including a processor and a memory. The memory stores a computer program, the computer program, when executed by the processor, causing the processor to perform the steps of the foregoing data processing method. The steps of the data processing method herein may be the steps of the data processing method in the foregoing embodiments.

In an embodiment, a computer-readable storage medium is provided, storing a computer program, the computer program, when executed by a processor, causing the processor to perform the steps of the foregoing data processing method. The steps of the data processing method herein may be the steps of the data processing method in the foregoing embodiments.

"First" and "second" in the embodiments of this application are merely used for distinction, and are not intended to constitute a limitation in aspects of a size, an order, subordination, or the like.

It is to be understood that steps in the various embodiments of this application are not necessarily performed in a sequence indicated by the step numbers. Unless explicitly specified in this application, the sequence for performing the steps is not strictly limited, and the steps may be performed in other sequences. Moreover, at least some of the steps in each embodiment may include a plurality of sub-steps or a plurality of stages. The sub-steps or stages are not necessarily performed at the same moment but may be performed at different moments. These sub-steps or stages are not necessarily performed in sequence, but may be performed in turn or alternately with at least some of other steps or sub-steps or stages of the other steps.

A person of ordinary skill in the art may understand that all or some of the processes of the methods in the foregoing embodiments may be implemented by a computer program instructing relevant hardware. The program may be stored in a non-volatile computer-readable storage medium. When the program runs, the procedures of the foregoing method embodiments may be performed. Any reference to the memory, storage, a database, or other media used in the embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash. The volatile memory may include a random access memory (RAM) or an external cache. As an illustration instead of a limitation, the RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM), a synchronization link (Synchlink) DRAM (SLDRAM), a Rambus direct RAM (RDRAM), a direct Rambus dynamic RAM (DRDRAM), and a Rambus dynamic RAM (RDRAM).

Various technical features in the foregoing embodiments may be combined randomly. For ease of description, possible combinations of various technical features in the foregoing embodiments are not all described. However, the combinations of the technical features are to be considered as falling within the scope recorded in this specification provided that the combinations of the technical features are compatible with each other.

The foregoing embodiments only describe several implementations of this application, which are described specifically and in detail, but cannot be construed as a limitation to the patent scope of the present disclosure. A person of ordinary skill in the art may make various changes and improvements without departing from the ideas of this application, which shall all fall within the protection scope of this application. Therefore, the protection scope of the patent of this application shall be subject to the appended claims.

What is claimed is:

1. A data processing method, performed by a blockchain node having a processor and a memory storing a plurality of computer programs to be executed by the processor, the method comprising:

for each block of a plurality of blocks in a first block file of a blockchain platform, detecting a to-be-maintained transaction record in the block, wherein the to-be-maintained transaction record is present in a set of transaction records associated with the blockchain platform for which account reconciliation is unsuccessful;

selecting, from a hash tree of the block, nodes used for proving that the transaction record belongs to the block, wherein the nodes include a leaf node corresponding to the transaction record and a set of neighboring nodes associated with the leaf node in the hash tree of the block;

constructing a node maintenance tree according to the selected nodes;

storing the transaction record at a corresponding leaf node of the node maintenance tree;

migrating an association between a block head of the block and the node maintenance tree storing the transaction record from the first block file to a second block file, the block head of the block being adjacent to a block head of a previous block in the second block file; and after completing the migration for each block of the plurality of blocks, deleting the first block file from the blockchain platform.

2. The method according to claim 1, wherein the method further comprises:

in response to detecting that there is no to-be-maintained transaction record in the block, updating the block head of the previous block adjacent to the block head of the block to the second block file.

3. The method according to claim 1, wherein the set for which account reconciliation is unsuccessful comprises an account-unreconciled set; and the method further comprises:

storing, in response to receiving an account reconciliation call request transmitted by a first account reconciliation device, a first transaction record for which account reconciliation is to be performed to the block in the first block file through a smart contract, the first transaction record being carried in the account reconciliation call request;

obtaining, through the smart contract, an account reconciliation association identifier corresponding to the first transaction record;

searching an account-unreconciled set created on a blockchain for a second transaction record associated with a second account reconciliation device corresponding to the account reconciliation association identifier; and adding the first transaction record and the account reconciliation association identifier corresponding to the first transaction record to the account-unreconciled set in response to not finding the second transaction record.

4. The method according to claim 3, wherein the set for which account reconciliation is unsuccessful further comprises an account reconciliation error set; and the method further comprises:

removing the second transaction record from the account-unreconciled set in response to finding the second transaction record;

comparing the first transaction record with the second transaction record; and adding the first transaction record and the second transaction record to the account reconciliation error set in response to that the comparison is inconsistent.

5. The method according to claim 1, wherein the selecting, from a hash tree of the block, nodes used for proving that the transaction record belongs to the block comprises:

selecting a first ancestor node and a sibling leaf node of the leaf node from the hash tree; and selecting, for a non-sibling leaf node of the leaf node, a second ancestor node of the non-sibling leaf node nearest to a root node; and constructing a node maintenance tree according to the leaf node, the first ancestor node, the sibling leaf node, and the second ancestor node.

6. The method according to claim 1, wherein the hash tree is a double-layer hash tree, a hash value of a root node of the double-layer hash tree is obtained by performing a hash operation after hash values of all leaf nodes are connected in series and combined, and the selected nodes are all nodes of the hash tree.

7. The method according to claim 1, further comprising:
obtaining a second storage position of the second block file; and
modifying a position index of the block from pointing to a first storage position of the first block file to pointing to the second storage position.

8. A computer device, comprising a memory and a processor, the memory storing a plurality of computer programs, the computer programs, when executed by the processor, cause the processor to perform a plurality of operations including:
for each block of a plurality of blocks in a first block file of a blockchain platform, detecting a to-be-maintained transaction record in the block, wherein the to-be-maintained transaction record is present in a set of transaction records associated with the blockchain platform for which account reconciliation is unsuccessful;
selecting, from a hash tree of the block, nodes used for proving that the transaction record belongs to the block, wherein the nodes include a leaf node corresponding to the transaction record and a set of neighboring nodes associated with the leaf node in the hash tree of the block;
constructing a node maintenance tree according to the selected nodes;
storing the transaction record at a corresponding leaf node of the node maintenance tree;
migrating an association between a block head of the block and the node maintenance tree storing the transaction record from the first block file to a second block file, the block head of the block being adjacent to a block head of a previous block in the second block file; and
after completing the migration for each block of the plurality of blocks, deleting the first block file from the blockchain platform.

9. The computer device according to claim 8, wherein the plurality of operations further comprises:
in response to detecting that there is no to-be-maintained transaction record in the block, updating the block head of the previous block adjacent to the block head of the block to the second block file.

10. The computer device according to claim 8, wherein the set for which account reconciliation is unsuccessful comprises an account-unreconciled set; and the plurality of operations further comprises:
storing, in response to receiving an account reconciliation call request transmitted by a first account reconciliation device, a first transaction record for which account reconciliation is to be performed to the block in the first block file through a smart contract, the first transaction record being carried in the account reconciliation call request;
obtaining, through the smart contract, an account reconciliation association identifier corresponding to the first transaction record;
searching an account-unreconciled set created on a blockchain for a second transaction record associated with a second account reconciliation device corresponding to the account reconciliation association identifier; and
adding the first transaction record and the account reconciliation association identifier corresponding to the first transaction record to the account-unreconciled set in response to not finding the second transaction record.

11. The computer device according to claim 10, wherein the set for which account reconciliation is unsuccessful further comprises an account reconciliation error set; and the plurality of operations further comprises:
removing the second transaction record from the account-unreconciled set in response to finding the second transaction record;
comparing the first transaction record with the second transaction record; and
adding the first transaction record and the second transaction record to the account reconciliation error set in response to that the comparison is inconsistent.

12. The computer device according to claim 8, wherein the selecting, from a hash tree of the block, nodes used for proving that the transaction record belongs to the block comprises:
selecting a first ancestor node and a sibling leaf node of the leaf node from the hash tree; and
selecting, for a non-sibling leaf node of the leaf node, a second ancestor node of the non-sibling leaf node nearest to a root node; and
constructing a node maintenance tree according to the leaf node, the first ancestor node, the sibling leaf node, and the second ancestor node.

13. The computer device according to claim 8, wherein the hash tree is a double-layer hash tree, a hash value of a root node of the double-layer hash tree is obtained by performing a hash operation after hash values of all leaf nodes are connected in series and combined, and the selected nodes are all nodes of the hash tree.

14. The computer device according to claim 8, wherein the plurality of operations further comprises:
obtaining a second storage position of the second block file; and
modifying a position index of the block from pointing to a first storage position of the first block file to pointing to the second storage position.

15. A non-transitory computer-readable storage medium, the computer-readable storage medium storing a plurality of computer programs, the computer programs, when executed by a processor, causing the processor to perform a plurality of operations including:
for each block of a plurality of blocks in a first block file of a blockchain platform, detecting a to-be-maintained transaction record in the block, wherein the to-be-maintained transaction record is present in a set of transaction records associated with the blockchain platform for which account reconciliation is unsuccessful;
selecting, from a hash tree of the block, nodes used for proving that the transaction record belongs to the block, wherein the nodes include a leaf node corresponding to the transaction record and a set of neighboring nodes associated with the leaf node in the hash tree of the block;
constructing a node maintenance tree according to the selected nodes;
storing the transaction record at a corresponding leaf node of the node maintenance tree;
migrating an association between a block head of the block and the node maintenance tree storing the transaction record from the first block file to a second block file, the block head of the block being adjacent to a block head of a previous block in the second block file; and
after completing the migration for each block of the plurality of blocks, deleting the first block file from the blockchain platform.

16. The non-transitory computer-readable storage medium according to claim 15, wherein the plurality of operations further comprises:
   in response to detecting that there is no to-be-maintained transaction record in the block, updating the block head of the previous block adjacent to the block head of the block to the second block file.

17. The non-transitory computer-readable storage medium according to claim 15, wherein the set for which account reconciliation is unsuccessful comprises an account-unreconciled set; and the plurality of operations further comprises:
   storing, in response to receiving an account reconciliation call request transmitted by a first account reconciliation device, a first transaction record for which account reconciliation is to be performed to the block in the first block file through a smart contract, the first transaction record being carried in the account reconciliation call request;
   obtaining, through the smart contract, an account reconciliation association identifier corresponding to the first transaction record;
   searching an account-unreconciled set created on a blockchain for a second transaction record associated with a second account reconciliation device corresponding to the account reconciliation association identifier; and
   adding the first transaction record and the account reconciliation association identifier corresponding to the first transaction record to the account-unreconciled set in response to not finding the second transaction record.

18. The non-transitory computer-readable storage medium according to claim 15, wherein the selecting, from a hash tree of the block, nodes used for proving that the transaction record belongs to the block comprises:
   selecting a first ancestor node and a sibling leaf node of the leaf node from the hash tree; and
   selecting, for a non-sibling leaf node of the leaf node, a second ancestor node of the non-sibling leaf node nearest to a root node; and
   constructing a node maintenance tree according to the leaf node, the first ancestor node, the sibling leaf node, and the second ancestor node.

19. The non-transitory computer-readable storage medium according to claim 15, wherein the hash tree is a double-layer hash tree, a hash value of a root node of the double-layer hash tree is obtained by performing a hash operation after hash values of all leaf nodes are connected in series and combined, and the selected nodes are all nodes of the hash tree.

20. The non-transitory computer-readable storage medium according to claim 15, wherein the plurality of operations further comprises:
   obtaining a second storage position of the second block file; and
   modifying a position index of the block from pointing to a first storage position of the first block file to pointing to the second storage position.

* * * * *